June 2, 1964     I. H. CULVER     3,135,334
ROTOR

Filed Dec. 5, 1960     2 Sheets-Sheet 1

INVENTOR.
IRVEN H. CULVER
BY
Agent

June 2, 1964  I. H. CULVER  3,135,334
ROTOR

Filed Dec. 5, 1960  2 Sheets-Sheet 2

INVENTOR.
IRVEN H. CULVER
BY
*George C. Sullivan*
Agent

United States Patent Office 3,135,334
Patented June 2, 1964

3,135,334
ROTOR
Irven H. Culver, Burbank, Calif., assignor to Lockheed
Aircraft Corporation, Burbank, Calif.
Filed Dec. 5, 1960, Ser. No. 73,779
3 Claims. (Cl. 170—160.13)

This invention relates to a rotary wing for an aircraft such as a helicopter.

Rotary wing aircraft to date have been notoriously unstable. Those which are stable during power-on flight are susceptible to disturbances in power-off conditions. Those which show a high degree of stability during power-off conditions are unmanageable during powered flight. In all cases, rotors have been relatively complex demanding careful maintenance and a considerable amount of skill on the part of the pilot to fly the aircraft.

It is one of the primary objects of this invention to provide a rotor having stabilizing features so that disturbances to the aircraft or its rotor will be overcome. Each rotor blade is pivoted about its feather axis and has an arm integral therewith and extending forwardly in the direction of rotation on the end of which is a positive pitched aerodynamic mass; that is, a mass having aerodynamic lift surfaces with a relatively high angle of attack. When the rotor blade or the aircraft body is disturbed, the mass at the end of the integral forwardly extending cross arm will tend to maintain its plane of rotation and will cause the rotor blade to vary its angle of attack to cancel any precession effect due to the disturbance.

It is another important object of the present invention to provide a rotor having compliance capability. In the present invention, the blade aerodynamic axis extends forwardly of the feather axis. Disturbances to the aircraft or the blade will cause the blade to rotate around the feather axis to increase or decrease pitch to overcome the effects of precession due to these disturbances and to damp oscillations resulting from these disturbances.

It is another object of this invention to provide a rotor for a rotary wing aircraft which has the ability to automatically set in proper pitch angle for autorotation. Input controls include pre-biased springs, a cross arm mass with positive pitch and a cross arm vertical angle which may be carefully adjusted so that in power-off conditions the proper pitch is maintained to allow optimum autorotation characteristics.

It is another object of this invention to provide a rotor which has the ability of automatic collective pitch control for any r.p.m. Geometry, stiffness, masses and springs for the rotor system are carefully chosen so as to give desired collective pitch settings without additional mechanism and/or pilot control. The rotor has the additional advantage in that manually operated collective pitch can be used in conjunction with the invention with no basic change in design.

It is another object of this invention to provide a rotor which does not require chordwise hinges to maintain control stability or structural integrity. Prior rotary wings aircraft have required the use of flapping blades to minimize the effects of vertical disturbances along the blade. The use of arms having masses at their ends at an angle with respect to the rotor blade and a blade aerodynamic axis at a slight angle with respect to the feather axis overcomes the problem approached by the flapping blade so as to eliminate that requirement.

It is another object of this invention to provide a rotor having a high degree of damping of body motion from external forces.

Further objects and advantages of the present invention will become apparent from a reading of the following specification when taken in conjunction with the appended drawings.

Non-flapping rotor blades have certain advantages useful in rotary wing aircraft. However, to date, their advantages have been outweighed by certain disadvantages making them generally impractical. Basically, it has been extremely difficult to eliminate the coupling of roll and pitch motions due to external disturbances and to damp the oscillations caused by the disturbance. Disturbances either to the rotor blade or to the body of the helicopter will cause a forward or retro mode of gyroscopic precession.

An examination of the action of rotary wing aircraft having a rigid rotor is desirable. One law of angularly moving bodies states generally that a disturbance normal to the direction of movement will result in maximum displacement someplace later in the path of the angularly moving body. Where the body is moving in a circular path the maximum displacement will occur 90° later in its rotation. Thus, if the rotary wing aircraft body 10 is pitched downwardly as shown by arrow A in FIGURE 1 due to some aerodynamic disturbance, the rotor disc will be bent to the dotted line position. The body pitch has the effect of putting a down force on the rotor blade in the forward position and an up force on the aft blade. Since rotor 11 is a rotating body, the maximum effect of this disturbance force will be felt at a position 90° later in rotation or when the disturbed blades are in their lateral positions.

Figure 1:
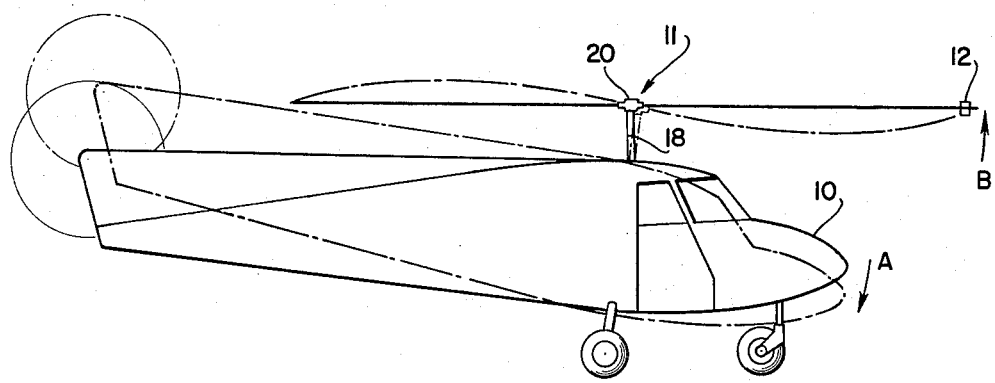
FIGURE 1 is a side view illustrating the effects of disturbances to the rotor.

The effect on mass 12 toward the end of a forwardly extending rotor blade of FIGURE 1 will illustrate the principle. An exaggerated explanation will be given. The pitch down disturbance A will impart a downward motion to mass 12 through the bending of rotor blade 15 in its forward position. Mass 12 will coincidentally move circularly with its blade. In the lateral position the down force will put a roll motion into aircraft body 10 which will resist because of its inertia. This has the effect of putting an up force on the mass 12. Mass 12 will begin to move up. In the aft position or parallel to the boom of the body 10, it will tend to cause body 10 to pitch down. Inertia again stops vertical motion of mass 12 and causes it to be pushed downwardly so that its maximum effect will be felt in the lateral or right hand position at the lower side of FIGURE 2. This effect will tend to cause the body 10 to roll to the right. The inertia of body 10 again puts an up force to mass 12 the results of which will be felt when the blade is in its forward position to give a pitch up to body 10. Note that this is a coupling of roll and pitch motion of the aircraft body 10. The roll resulted in a pitch which resulted in a roll. Note further that the apparent motion of the body 10 is in the direction of rotor rotation. This is called a forward mode of coupling. In fact the above action will occur only after several revolutions of rotor 11 instead of one every circuit. This exaggerated explanation is given for ease of understanding.

Figure 2:
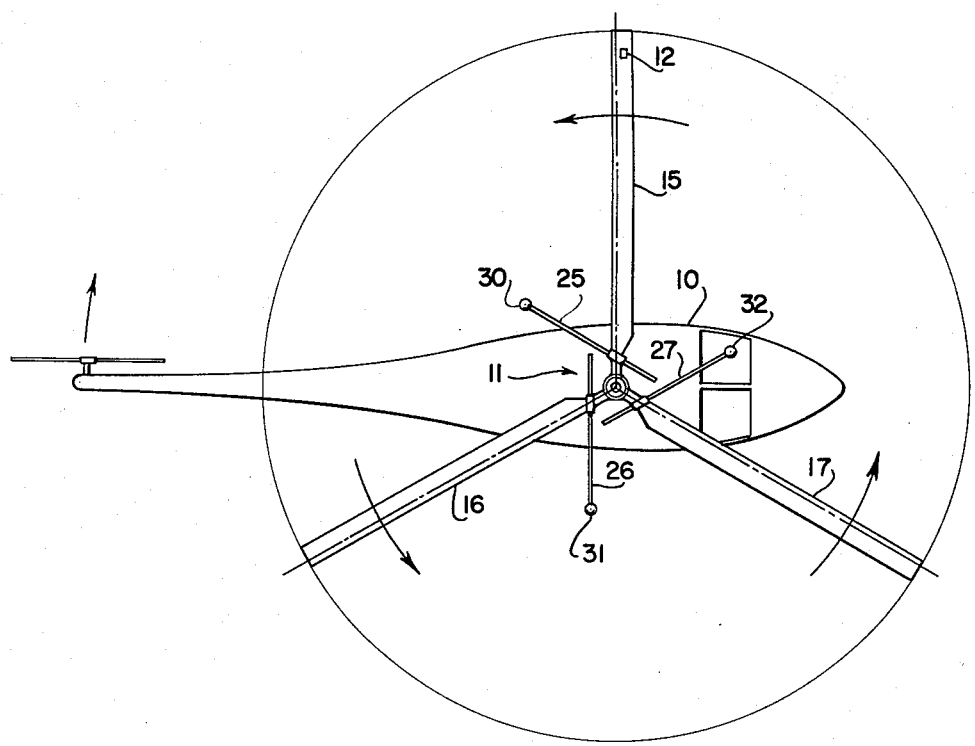
FIGURE 2 is a plan view of a helicopter to illustrate damping characteristics of the present invention.

On the ground disturbing motions to the aircraft body 10 will be resisted by the surface on which it rests. An exaggerated explanation is again given to illustrate. Observing FIGURE 1 again, should mass 12 be pushed upwardly by some vertical force such as indicated by B shown in FIGURE 1, its maximum effect will be felt in the lateral or left position. The mass 12 being thrown up and rotating counterclockwise will roll the body 10 to the right when the mass 12 is in the left hand lateral position or the position of blade 15 as seen in FIGURE 2. Weight of the aircraft then will be on its right wheel. The weight of the aircraft will resist and roll it back left and force mass 12 downwardly until it reaches the aft position parallel with the body 10. At that position the weight of the helicopter will be forced on the back of both of the main wheels as seen in FIGURE 1 tending to pitch the nose upwardly. Again the weight of the aircraft forces mass 12 up until at its right position or the lower side of FIGURE 2 it is at its extreme up position again. This puts the weight on the left wheel of the rotary wing aircraft. The weight forces the mass 12 down again until it is down in its forwardmost position tending to pitch the nose of the aircraft down or putting the weight on the nose wheel. Note that the apparent sequence of motion of body 10 is clockwise or opposite to the rotation of the rotor 11. That is, the mass 12 causes the weight of the aircraft to be placed upon the right wheel when it is in its left position, on the back of the aircraft when it is in the aft position, on the left wheel when the mass 18 is in the right side of its orbit and on the nose wheel when it is forward. This is called the retro mode of coupling.

The present invention provides means to dampen and counteract the described reaction to disturbances. The rotor 11 is equipped with individually articulated blades which can vary from one to any number. It is shown here with three blades, 15, 16 and 17 for purposes of example. Each feather axis passes substantially through the vertical drive shaft 18 on which the hub 20 is mounted. Control inputs to the rotor blades 15–17 are transmitted from the swash plate 22 through springs 23 to the leading edge of each rotor blade at its root. Swash plate 22 receives its control input from the cockpit. Rotor blades 15–17 are equipped with cross arms 25, 26 and 27 on the ends of which are masses 30, 31 and 32 having aerodynamic lift surfaces with a positive angle of attack, or positive pitch, in the direction of rotation (counterclockwise as viewed in FIGURES 2 and 3) for basic earth sensing stability as described in co-pending United States application Serial Number 844,886, dated October 7, 1959. Each cross arm is attached to a cuff member 33 at the blade root by means of a sleeve attachment member 34 integral with the cuff member. Each arm extends aft of the rotor blade and has a certain mass to provide a moment about the feather axis. As can be seen in FIGURE 4 each forwardly extending cross arm 25–27 is bent downwardly so that at rest the masses 30, 31 and 32 are below the point of attachment of the hub to the shaft.

At rest the blades 15, 16 and 17 will have zero lift. As r.p.m. increases centrifugal force throws the masses 30, 31 and 32 on the ends of arms 25, 26 and 27 outwardly and upwardly. Additionally the positive pitch of masses 30, 31 and 32 will tend to raise the arms, thus increasing the pitch of blades 15, 16 and 17. The faster the rotor is driven, the greater the pitch of the rotor blades 15, 16 and 17. The greater the pitch, the greater the power required tending toward a constant speed characteristic. This is useful not only in powered flight but in auto rotation.

While rotor 11 is at rest and at low r.p.m. the springs 23 maintain the pitch of the blades 15–17 at a negative or neutral position so as to minimize low r.p.m. vibrations inherent in rotary wing aircraft. Not until sufficient r.p.m. are put in will the masses 30 to 32 counteract the pre-tension of springs 23 to increase the pitch of the blades 15–17. At this time the low r.p.m. range of vibration and control stick oscillation will be passed through with minimum disturbance.

Control inputs through swash plate 22, springs 23 and horns 24 to the rotor blades 15 to 17 are direct inputs to the masses 30, 31 and 32 which form a gyro. Since the rotor blades 15 to 17 are fixed to the cross arms 25 to 27 on which the masses 30 to 32 are mounted, they tend to follow in the same plane of rotation established by the rotating masses 30 to 32. In other words, the rotor 11 is slaved to the gyro formed by masses 30–32. Cyclic pitch is possible through this simple control system in a manner similar to that described in co-pending United States application Serial Number 844,886, filed October 7, 1959. Thus, if the rotor plane is to be tilted forward for forward flight the gyro formed by masses 30–32 will likewise be tilted forward.

Since masses 30–32 are angularly moving bodies control inputs must occur ahead of the desired result. If the arms 25 to 27 were at exactly 90° to the rotor blades 15 to 17, the swash plate 22 would be tilted to the right for forward tilt of the gyro and the rotor disc for forward flight. That is the swash plate would be tilted to the right for forward pitch and to the left for up pitch.

Since however the cross arms are not at right angles but at some other angle less than 90°, the swash plate must be tilted to compensate for this angular displacement. Thus, it will have a slight forward tilt in addition to the side tilt for a down pitch or forward control of the rotary wing aircraft 10.

Placement of the cross arms 25 to 27 behind the 90° position with respect to each of the rotor blades 15 to 17 to which they are fixed requires a like angular control input change forward of the 90° position of the swash plate for the desired control response. Thus, for pitch down for the purpose of forward movement in the cross arms 25 to 27 are 30° behind the 90° position with respect to the rotor blades, the swash plate will be tilted not at the 90° position with respect to the fore and aft axis but at the 30° ahead of that point in the direction of rotation of the rotor 11.

At this point, the ability of the rotor 11 with its cross arms 25 through 27 and masses 30 to 32 to overcome distrubances will be recognized. Note that in our discussion of the rigid rotor having non-flapping blades, a disturbance to the aircraft or to the rotor will be coupled so that roll disturbance will cause a pitch oscillation and vice versa. However, the present rotor 11 utilizes aerodynamic forces to offset the structural forces due to the inertia of the body 10 to prevent percession and coupling. Observe FIGURE 1 where the pitch down disturbance is shown by the arrow A. Assuming that blade 15 is in the forward position, the cross arm 25 will be located someplace less than 90° left of the blade 15 as seen in FIGURE 2. Remember that the mass 30 has a positive pitch as do masses 31 and 32. Thus, a down pitch to the body 10 will cause the roof of the forwardly extending rotor blade 15 to move down.

Another law of rotating bodies says that a rotating body will tend to maintain its plane of rotation. Thus, mass 30 will maintain its rotational plane. The rotor plane passing through hub 20 deviates away from the gyro plane resulting in an apparent upward deflection of the gyro plane with respect to the rotor plane passing through hub 20. The divergence of these planes will rotate blade 15 about its feather axis to increase its pitch. In fact, the rotor plane diverges away from the gyro plane causing the pitch of the blades to be changed so that they will return to their original path. The down force imparted to the rotor blade from the pitch down disturbance will be counteracted by increased lift. The net result will be that rotor 11 will effectively not deviate from its plane of rotation and the disturbance to aircraft body 11 will be overcome. Disturbance around any other axes will be overcome in like manner.

The above eliminates coupling between roll and pitch oscillations. There remains the problem of pure uncoupled oscillations which result from the tendency of the aircraft body 10 and the rotor to oscillate about their normal relative positions after a disturbance to either.

Figure 3:
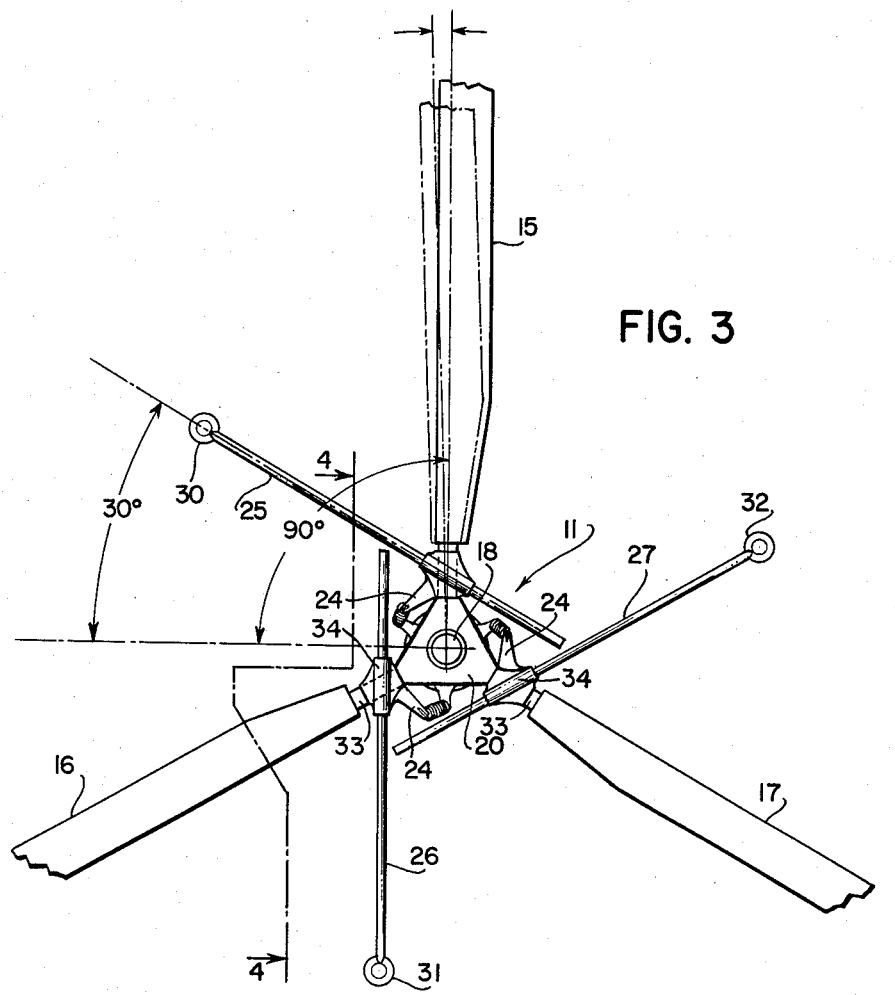
FIGURE 3 is a plan view of the rotor with parts of the blades broken away.
Figure 4:
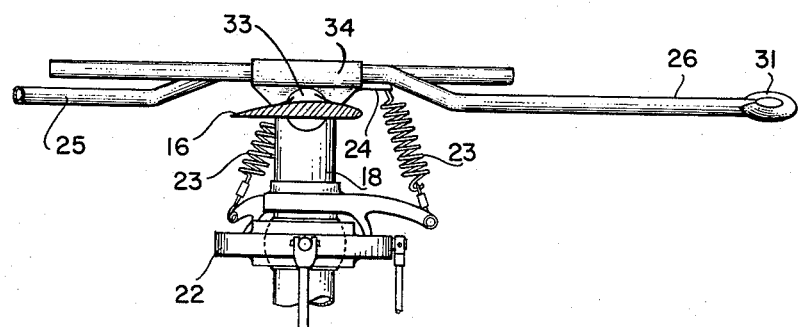
FIGURE 4 is a view taken on lines 4—4 of FIGURE 3.

As shown in FIGURE 3, the blade aerodynamic axis (A.A.) is represented by a line parallel to and about a 0.25 chord aft of the blade leading edge. This axis is forward of the feather axis (F.A.) about which the blade pivots to change pitch. A disturbance to the body such as that shown in FIGURE 1 by arrow A tends to displace a forwardly extending blade, such as 17, downwardly, the load being applied along the feather axis. However, since the center of lift lies along the aerodynamic axis, there will also be a net up pitching moment tending to cause the blade to rotate nose-up about the feather axis. This will apply an up input force to the mass 32 at the end of the cross arm 27. The maximum upward displacement of the mass 32 due to this input will occur 90° later in rotation after blade 17 passes the forward position and the gyro will be precessed up when generally over the rear end of the body and down over the nose. The rotor plane will follow, and the net effect is to precess the rotor in the same direction as the disturbance.

This precession reduces the amount of pitch displacement between the disturbed body and the rotor, which is equivalent to saying that there is less stored energy in the system than it would have if the rotor displacement in the direction of the disturbance had not occurred. Inasmuch as energy is removed by the displacement process, the process has the effect of damping the disturbance; that is, each succeeding pitch oscillation of the body will be of smaller amplitude and the oscillations will rapidly die out.

A rotor for a rotary wing aircraft has been disclosed which has compliance features, cyclic pitch ability, optimum auto rotation characteristics, automatic collective pitch control and aerodynamic damping characteristics. Having disclosed the details of my invention, I now claim the following combinations and their equivalents.

I claim:

1. A helicopter rotor system comprising: a rotor drive shaft; a hub fixed to the drive shaft; a plurality of rotor blades having a root pivotably mounted on the hub about a feather axis substantially at right angles to the axis of the rotor drive shaft, said rotor blades having an aerodynamic axis slightly forward of the feather axis in the direction of rotation of the rotor; a cross arm extending forwardly from the root of each rotor blade at an acute angle with respect to the feather axis of the blade; and a mass on the forward end of each cross arm, said cross arms and masses comprising a control gyro for the rotor blades.

2. A helicopter rotor system comprising: a rotor drive shaft; a hub fixed to the rotor drive shaft; a plurality of rotor blades having a root rotatably mounted on the hub about a feather axis substantially at right angles to the axis of the rotor drive shaft; said rotor blades having an aerodynamic axis slightly forward of the feather axis in the direction of rotation of the rotor; a cross arm extending forwardly from the root of each rotor blade at an acute angle with respect to the feather axis of the blade; and a mass on the forward end of each cross arm, said mass having aerodynamic lifting surfaces with a positive angle of attack in the direction of rotor rotation.

3. A helicopter rotor system comprising: a rotor drive shaft; a hub fixed to the rotor drive shaft; a plurality of rotor blades having a root rotatably mounted on the hub about a feather axis substantially at right angles to the axis of the rotor drive shaft; each rotor blade having an aerodynamic axis slightly forward of the feather axis in the direction of rotation of the rotor; a cross arm extending forwardly and rearwardly from the root of each rotor blade, said forwardly extending portion of the cross arm being at an acute angle with respect to the feather axis of the blade; a mass on the forward end of each cross arm, said mass having aerodynamic lifting surfaces with a positive angle of attack in the direction of rotor rotation; a swashplate; horns mounted on the leading edge of the blades at the roots; and spring means connecting the swashplate with the horns, said spring means being prebiased to maintain the rotor blades at a neutral angle of attack during low speed revolutions of the rotor.

References Cited in the file of this patent

UNITED STATES PATENTS

| | | |
|---|---|---|
| 1,967,461 | Ballew | July 24, 1934 |
| 2,082,674 | Young | June 1, 1937 |
| 2,161,699 | Cierva | June 6, 1939 |
| 2,313,326 | Sensaud de Lavaud | Mar. 9, 1943 |
| 2,359,265 | Hackethal et al. | Sept. 26, 1944 |
| 2,489,343 | Wasserman | Nov. 29, 1949 |
| 2,519,762 | Hoffmann | Aug. 22, 1950 |
| 2,570,484 | Quinn | Oct. 9, 1951 |
| 2,684,722 | Perry | July 27, 1954 |
| 2,735,500 | Perry | Feb. 21, 1956 |
| 2,940,526 | Vongerichten | June 14, 1960 |

FOREIGN PATENTS

| | | |
|---|---|---|
| 1,115,436 | France | Jan. 3, 1956 |
| 512,363 | Italy | Jan. 31, 1955 |